(12) United States Patent
Lv et al.

(10) Patent No.: US 9,692,212 B2
(45) Date of Patent: Jun. 27, 2017

(54) BUILDING BLOCK TYPE QUICK-MOUNTING POWER DISTRIBUTION DEVICE

(71) Applicant: SHENZHEN TIEON ENERGY TECHNOLOGY CO., LTD., Shenzhen, Guangdong (CN)

(72) Inventors: Gang Lv, Guangdong (CN); Desheng Luo, Guangdong (CN)

(73) Assignee: SHENZHEN TIEON ENERGY TECHNOLOGY CO., LTD, Shenzhen (CN)

( * ) Notice: Subject to any disclaimer, the term of this patent is extended or adjusted under 35 U.S.C. 154(b) by 0 days.

(21) Appl. No.: 14/009,167

(22) PCT Filed: Oct. 18, 2012

(86) PCT No.: PCT/CN2012/083138
§ 371 (c)(1),
(2) Date: Oct. 1, 2013

(87) PCT Pub. No.: WO2013/113227
PCT Pub. Date: Aug. 8, 2013

(65) Prior Publication Data
US 2015/0207302 A1    Jul. 23, 2015

(30) Foreign Application Priority Data

Jan. 30, 2012 (CN) .......................... 2012 1 0020659

(51) Int. Cl.
H02B 1/04 (2006.01)
H02B 1/052 (2006.01)
H02B 1/36 (2006.01)

(52) U.S. Cl.
CPC ............... H02B 1/04 (2013.01); H02B 1/052 (2013.01); H02B 1/36 (2013.01)

(58) Field of Classification Search
CPC ............... H02G 3/08–3/20; H02B 1/04–1/056
USPC ......................................... 361/622, 624, 625
See application file for complete search history.

(56) References Cited

FOREIGN PATENT DOCUMENTS

CN         201966553 U   *   9/2011

* cited by examiner

*Primary Examiner* — Ramon M Barrera
(74) *Attorney, Agent, or Firm* — Jackson IPG PLLC; Demian K. Jackson

(57) ABSTRACT

The invention discloses a building block type quick-mounting power distribution device and a mounting method thereof. The device comprises a mounting assembly module; and an incoming line switching module for receiving and switching power signals, a switch measurement and control module for monitoring the received power signals and a feed-out end assembly module for outputting the power signals monitored by the switch measurement and control module to loads, which are all mounted on the mounting assembly module, respectively. While realizing power distribution function for loads, the power distribution devices may be stacked according to configuration requirements one upon one like building blocks during the screen assembling and mounting, so the assembling of a combined screen is simple and convenient, and easy to realize. Furthermore, since a single module occupies a small space, the capacity of a single screen is high.

10 Claims, 5 Drawing Sheets

BUILDING BLOCK TYPE QUICK-MOUNTING POWER DISTRIBUTION DEVICE

FIELD OF THE INVENTION

The invention relates to a power distribution device, in particular to a building block type quick-mounting power distribution device and a mounting method thereof.

BACKGROUND OF THE INVENTION

Power distribution devices are widely applied in power systems, particularly in power distribution fields, such as, AC/DC power supply screens, control cabinets, power distribution cabinets and power distribution boxes for transformer stations, to supply power to various power distribution devices and provide data analysis for power signals, in order to realize appropriate distribution of energy and ensure the quality of power supply and power management. There are generally two power distribution manners of the existing power source screen cabinets, control cabinets and power distribution cabinets (especially for transformer stations). One is fixed-mounting power distribution, i.e., switch components, acquisition and measurement devices, metering devices, control devices and signal indicators and etc. are all mounted separately and fixedly in a screen cabinet. Another is a 'semi-modularized' power distribution manner represented by a drawer cabinet. The two manners have respective characteristics. For the fixed-mounting power distribution manner, as the switch components and other devices are separately distributed in the screen cabinet, there are a large number of primary lines, secondary lines and communication lines between the switch components and the devices, and the switch components and the devices are mounted with all these lines open, as a result, the appearance is affected. In addition, the fixed-mounting power distribution manner has disadvantages of uncertainty, difficulty in production standardization, and inconvenient repair and maintenance as many primary lines and secondary lines are bundled together. In addition, the fixed-mounting power distribution manner also has the defects of heavy mounting workload, difficult mounting operation and high randomness of production, so it is difficult to keep the quality of products consistent. For the 'semi-modularized' power distribution manner represented by drawer cabinets or the like, switch components and other devices are concentrated in one drawer, and primary and secondary plug-in components are employed for power distribution by means of plugging-in, i.e., the switch components may be separated from an incoming line bus bar and an outgoing line cable. Although in this way, the switch components and other devices may be replaced and maintained conveniently, high requirements are proposed for the primary and secondary plug-in components, and the plug-in positions are likely to get hot; and meanwhile, there are also many messy secondary lines behind the cabinet, so that the appearance is still affected. In addition, for the 'semi-modularized' power distribution manner represented by drawer cabinets or the like, the screen assembling is tedious, each of the drawers has to be provided with a corresponding guide rail, and the drawers have to be separated and fixed by laminates. Therefore, it is difficult to assemble. Although this manner may still realize standardization, the degree of standardization is low. In addition, the 'semi-modularized' power distribution manner represented by drawer cabinets or the like has disadvantages that the capacity of a single screen is low and a large space in a screen cabinet is occupied.

SUMMARY OF THE INVENTION

The technical problem to be solved by the invention is to provide a building block type quick-mounting power distribution device, in view of defects in the prior art that the power distribution device is difficult to mount, the capacity of a single screen is low, and there are many messy lines.

The technical solution employed by the invention to solve the technical problem is to provide a building block type quick-mounting power distribution device, comprising a mounting assembly module; and an incoming line switching module for receiving and switching power signals, a switch measurement and control module for monitoring the power signals received by the incoming line switching module, and a feed-out end assembly module for outputting the power signals monitored by the switch measurement and control module to loads, which are all mounted on the mounting assembly module, respectively.

In the building block type quick-mounting power distribution device according to embodiments of the invention, the mounting assembly module comprises a module panel for mounting the incoming line switching module, the switch monitoring module and/or the feed-out end assembly module, and a mounting plate assembly detachably connected to the module panel.

In the building block type quick-mounting power distribution device according to embodiments of the invention, the incoming line switching module comprises a loop switch and an incoming line switching assembly provided with a first sub-bus bar, wherein power signals received from a main bus bar of a system feeder cabinet via the first sub-bus bar of the incoming line switching assembly are switched via the loop switch.

In the building block type quick-mounting power distribution device according to embodiments of the invention, the incoming line switching module comprises:

a protection plate for avoiding misoperation during the live line work of the loop switch;

a bus clamp assembly for connecting with the first sub-bus bar; and a bus bar shield of electric shielding.

In the building block type quick-mounting power distribution device according to embodiments of the invention, the module panel is provided with a sign indicating the type and name of loads carried by the loop switch and/or an OPEN label and a CLOSE label for displaying the working state of the loop switch.

In the building block type quick-mounting power distribution device according to embodiments of the invention, the switch measurement and control module is in communication with a system monitoring center for transmitting results of monitoring to the system monitoring center.

In the building block type quick-mounting power distribution device according to embodiments of the invention, the switch measurement and control module comprises:

a power bus bar for receiving power signals from the incoming line switching module;

a switch measurement and control output end for switching the power signals received from the power bus bar; and a monitoring unit for monitoring each phase of current and voltage signal of the power signals received from the power bus bar.

In the building block type quick-mounting power distribution device according to embodiments of the invention, the feed-out end assembly module comprises at least two feed-out end assemblies, wherein each of the feed-out end assemblies comprises a second sub-bus bar for receiving power signals from the switch measurement and control module and a feed-out output end for outputting the received power signals to loads.

The invention also provides a method for mounting a building block type quick-mounting power distribution device, comprising the following steps of:

stacking any one kind of the building block type quick-mounting power distribution devices as described above like building blocks; and fixing the stacked building block type quick-mounting power distribution devices onto a system feeder cabinet, wherein a main bus bar of the system feeder cabinet is connected with the incoming line switching module of the building block type quick-mounting power distribution device to output power signals, and the feed-out end assembly modules of the building block type quick-mounting power distribution devices is connected with loads to output the power signals.

In the method for mounting a building block type quick-mounting power distribution device of the embodiment of the invention, in the step of fixing the stacked building block type quick-mounting power distribution device onto the system feeder cabinet, the mounting assembly module of the building block type quick-mounting power distribution device is fixed on a front mounting column, a rear left mounting column, a rear right mounting column, a right module support, a left module support and a side mounting beam of the system feeder cabinet, respectively, so that the whole building block type quick-mounting power distribution device is fixed on the system feeder cabinet as a whole.

The invention has the following advantages. In the building block type quick-mounting power distribution device and the mounting method thereof according to embodiments of the invention, the power distribution device comprises four sub-modules: the mounting assembly module, the switch measurement and control module, the incoming line switching module and the feed-out end assembly module. While realizing power distribution function for loads, the power distribution device may be stacked according to configuration requirements one upon one like building blocks during the screen assembling and mounting, so the screen assembling is simple and convenient, and easy to realize. Furthermore, since a single module occupies a small space, the capacity of a single screen is high. In addition, due to the arrangement of the incoming line switching module and the feed-out end assembly module, no additional incoming line device and outgoing line device are required when in service.

BRIEF DESCRIPTIONS OF THE DRAWINGS

The invention will be further described as below by embodiments with reference to drawings. In the drawings.

DETAILED DESCRIPTIONS OF THE PREFERRED EMBODIMENTS

To make the purposes, technical solutions and advantages of the invention clearer, the invention will be further described as below in details by embodiments with reference to the drawings. It should be understood that the specific embodiments described here just explain the invention, but not limit the invention.

Figure 1:
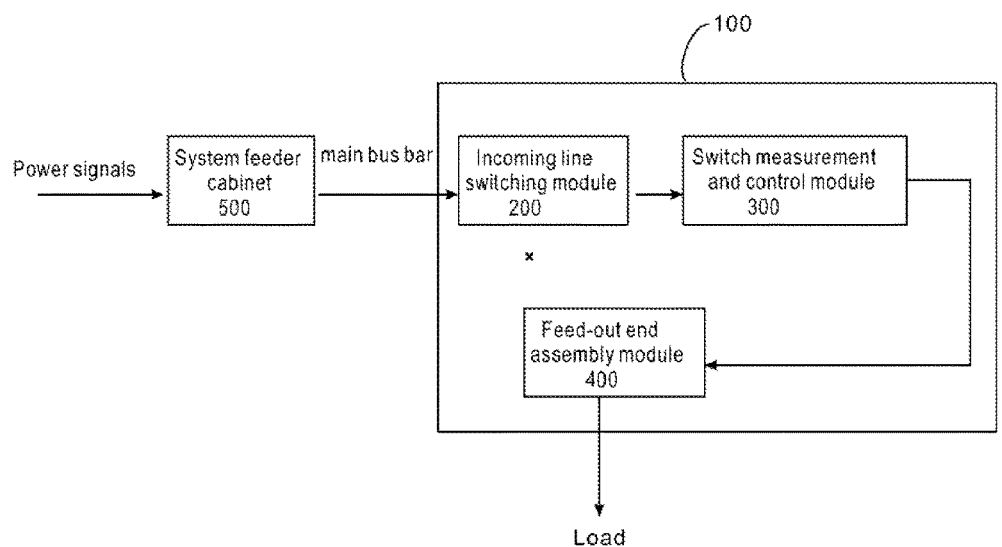
FIG. 1 is a block diagram of a building block type quick-mounting power distribution device according to embodiments of the invention.

FIG. 1 shows a building block type quick-mounting power distribution device according to embodiments of the invention, comprising a mounting assembly module 100; and an incoming line switching module 200 for receiving and switching power signals, a switch measurement and control module 300 for monitoring the power signals received by the incoming line switching module 200, and a feed-out end assembly module 400 for outputting the power signals monitored by the switch measurement and control module 300 to loads, which are all mounted on the mounting assembly module 100, respectively. Specifically, the power signals transmitted from a system main cabinet are input to a system feeder cabinet 500 (i.e., a power distribution cabinet for mounting the building block type quick-mounting power distribution device), and then input to the building block type quick-mounting power distribution device via a vertical main bus bar provided therein.

Figure 2:
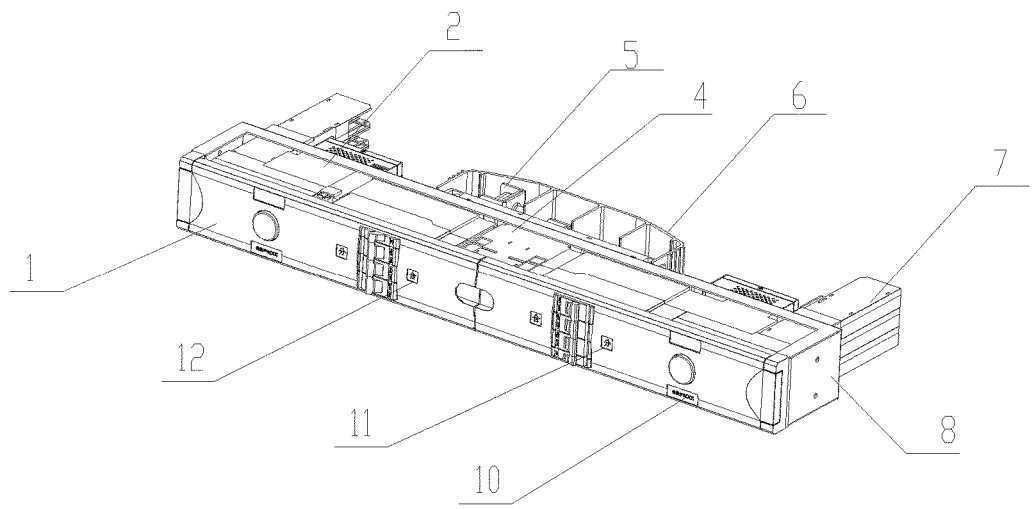
FIG. 2 is a front view of a 63 A micro-switch quick-mounting power distribution device according to embodiments of the invention.
Figure 3:
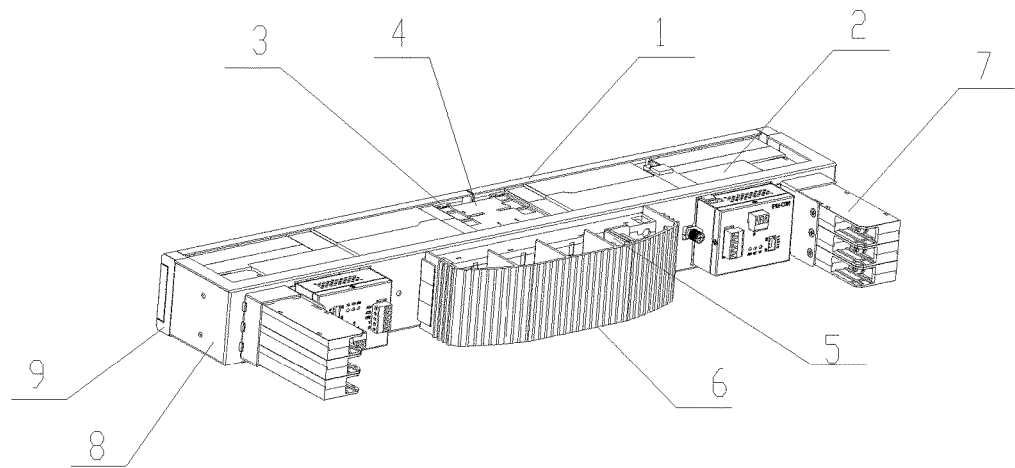
FIG. 3 is a rear view of a 63 A micro-switch quick-mounting power distribution device according to embodiments of the invention.
Figure 4:
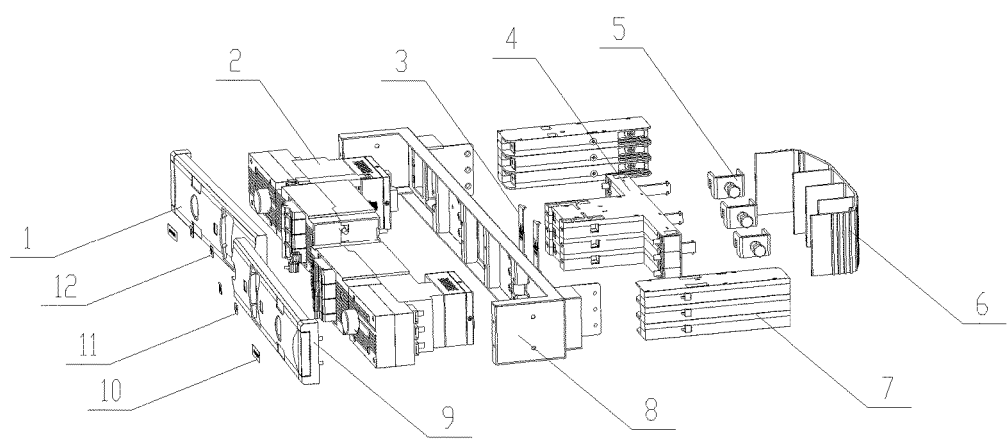
FIG. 4 is an exploded view of a 63 A micro-switch quick-mounting power distribution device according to embodiments of the invention.

The building block type quick-mounting power distribution device according to the embodiments of the invention will be described by taking 63 A micro-switch and 100-250 A molded switch quick-mounting power distribution devices as example. FIG. 2 to FIG. 4 show a front view, a rear view and an exploded view of a 63 A micro-switch quick-mounting power distribution device according to the embodiments of the invention. As shown, the building block type quick-mounting power distribution device according to the embodiments of the invention comprises a mounting assembly module 100, a switch measurement and control module 300, an incoming line switching module 200 and a feed-out end assembly module, wherein the switch measurement and control module 300, the incoming line switching module 200 and the feed-out end assembly module are all fixed on the mounting assembly module 100.

On one hand, the mounting assembly module 100 is used for fixing other modules, including the switch measurement and control module 300, the incoming line switching module 200 and the feed-out end assembly module; on the other hand, the mounting assembly module is used for mounting the building block type quick-mounting power distribution device in a screen cabinet (i.e., a system feeder cabinet) as a whole. In general, the mounting assembly module 100 comprises a module panel 1 and a mounting plate assembly 8. The module panel 1 and the mounting plate assembly 8 are detachably connected. This connection manner may be any well-known connection manner. As shown in FIG. 2 to FIG. 4, two ends of the module panel 1 are provided with two panel fixing lugs 9, respectively. Two ends of the mounting plate assembly 8 are provided with connection holes corresponding to the panel fixing lugs 9, respectively, while two ends of the mounting plate assembly 8 are provided with connection holes corresponding to the panel fixing lugs, respectively. After the panel fixing lugs 9 are inserted into the connection holes, the module panel 1 and the mounting plate assembly 8 are connected together.

Figure 5:
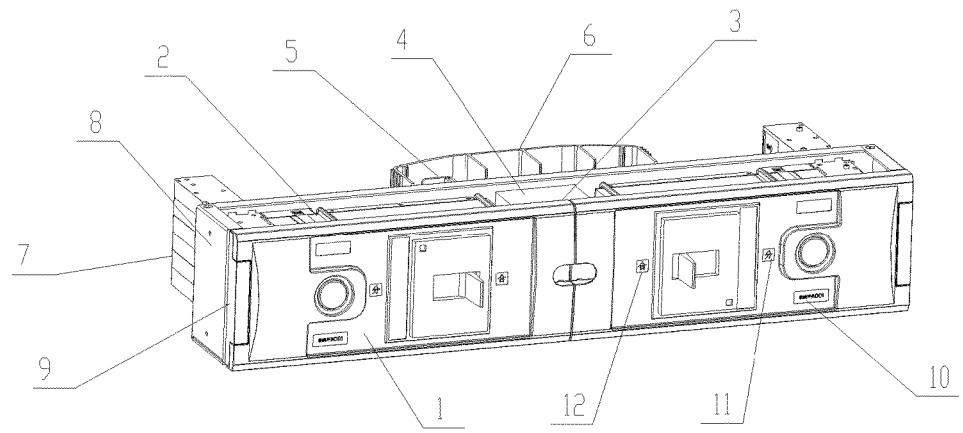
FIG. 5 is a front view of a 100-250 A molded switch quick-mounting power distribution device according to embodiments of the invention.

The incoming line switching module 200 comprises a loop switch and an incoming line switching assembly 4 provided with a first sub-bus bar. Power signals received from a main bus bar of the system feeder cabinet 500 via the first sub-bus bar of the incoming line switching assembly are switched via the loop switch. The loop switch may be selected from various international or domestic brands. The loop switch may perform opening and closing operations so as to realize the interruption and transmission of power signals. The first sub-bus bar is connected with an input end of the loop switch by an insulating screw, thereby switching the received power signals via the loop switch. Specifically, the incoming line switching module 200 is of a plastic structure and may comprises a plurality of incoming switching assemblies 4, generally, two to four incoming switching assemblies 4. The number of the incoming switching assemblies depends on the number of poles of the loop switch. In FIG. 5, there are three incoming line units. Therefore, power signals may be input to two loop switches simultaneously. One end of the first sub-bus bar of the incoming line switching assembly 4 is connected with a vertical main bus bar, while the other end thereof is connected with the input end of the switch measurement and control module 300, thereby providing power transmission function. Such incoming line switching module 200 may be quickly mounted on the above mounting plate assembly module via two built-in standard screws.

Further, the incoming line switching module 200 comprises a protection plate 3, a bus clamp assembly 5 and a bus bar shield 6, wherein the incoming line switching assembly 4 is fixedly mounted on the mounting plate assembly module 100 via the protection plate 3. For example, as shown in FIG. 2 to FIG. 4, the incoming line switching assembly 4 is fixedly mounted on the mounting plate assembly 8 of the mounting plate assembly module 100 via the protection plate 3; and the bus clamp assembly 5 is fixed on the incoming line switching assembly 4, furthermore, disposed between the incoming line switching assembly 4 and the bus bar shield to be covered by the bus bar shield, so that the bus bar is protected by the bus bar shield. In this embodiment, the bus clamp assembly 5 is a perforate-free bus clamp assembly 5. During the operation, a cable is fixed by the bus clamp assembly 5 and then fed into the incoming line switching assembly 4 to input power signals, thereby powering on the bus bar. Meanwhile, there are no other additional incoming line devices required during the powering on process. Of course, the available bus clamp is not limited to the perforate-free bus clamp assembly 5 mentioned above, it may be any bus clamp assembly 5 capable of fixing the bus. Specifically, in the incoming line switching module 200, because the insulating screw, from which the power signals are input, is exposed directly, in order to avoid misoperation during the live line work of the loop switch, the operator should ensure that the operating handle of the loop switch is turned to an OPEN position before operating the insulating screw at the power input end to avoid accidents. This is why the protection plate is provided. In addition, the bus clamp assembly here may preferably be a perforate-free bus clamp assembly that reliably connects two vertical sub-bus bars without mounting holes together, to realize the reliable transmission of the power signals from the vertical main bus bar of a main loop to the first sub-bus bar. On one hand, reliable connection, quick mounting and simple production are ensured; on the other hand, no capacity drop can be realized between the bus bars at two ends connected by such bus clamp assembly. The bus bar shield is used for electric shielding, for example, isolating all internal live parts, thereby realizing no live parts exposed outside, avoiding accidents caused by incaution touching live parts by operators, and enhancing the safety.

On this basis, the module panel 1 is also provided with a sign 10, an OPEN label 11 and/or a CLOSE label 12, wherein the sign may be used for indicating the type and name of loads carried by the loop switch, while the OPEN label and the CLOSE label are used for displaying the state of the loop switch. For example, when the operating handle of the loop switch is turned to the OPEN label, it is indicated that the loop switch is in the OFF position and the loads carried by the loop switch are in the shutdown state; and when the operating handle of the loop switch is turned to the CLOSE label, it is indicated that the loop switch is the ON position and the loads carried by the loop switch are in the running state.

The switch measurement and control module 300 may be fixedly disposed on the module panel 1 and/or the mounting plate assembly 8, wherein in the 63 A micro-switch quick-mounting power distribution device, the switch measurement and control module 300 may be disposed between the module panel 1 and the mounting plate assembly 8, in this case, it may be fixedly disposed on the module panel 1, or on the module panel 1 and the mounting plate assembly 8 simultaneously, or on the mounting plate assembly 8 only. The switch measurement and control module 300 comprises a power bus bar for receiving power signals from the incoming line switching module 200, a switch measurement and control output end for switching the power signals received from the power bus bar, and a monitoring unit for monitoring each phase of current and voltage signal of the power signals received from the power bus bar, wherein the monitoring unit may preferably be a precise Hall sensor. In addition, the switch measurement and control module 300 may further comprise a small PCB for detecting the state and position of the loop switch. The equipment for monitoring power signals include, but not limited to, the kinds of equipment described above, and various kinds of equipment for monitoring power signals may be employed without departing from the protection scope of the invention.

In addition, the switch measurement and control module 300 is in communication with a system monitoring center to transmit results of monitoring to the system monitoring center. Specifically, the switch measurement and control module 300 performs data acquisition via the above monitoring equipment (including the monitoring unit, small PCB, etc.), then transmits the data to an IPM-C monitoring device for centralized processing, uploads the data to a system communication management mechanism via a communication line, and finally uploads the data to the system monitoring center via the system communication management mechanism. The system monitoring center monitors the relevant parameters transmitted by the switch measurement and control module 300 over the network and detects the current, voltage, power, harmonic wave, stage of the loop switch, etc.

The feed-out end assembly module comprises at least two feed-out end assemblies 7. In this embodiment, there are two feed-out end assemblies 7 disposed on two sides of the incoming line switching assembly 4 of the incoming line switching module 200 and fixedly mounted on the mounting plate assembly 8 of the mounting assembly module 100, in this way, a configuration function of one input and two outputs is realized. It can be seen from the above descriptions that, in the building block type quick-mounting power distribution device according to the embodiments of the invention, the arrangement of the feed-out end assemblies 7 may realize a configuration function of one input and one output or a configuration function of one input and two outputs or the like of the power distribution device, without requiring any additional outgoing line device. Each of the feed-out end assemblies comprises a second sub-bus bar for receiving power signals from the switch measurement and control module 300 and a feed-out output end for outputting the received power signals to loads.

The method for mounting a building block type quick-mounting power distribution device according to the embodiments of the invention comprises the following steps of: first, stacking any number (two, four, etc.) of any kind of the building block type quick-mounting power distribution devices described above like building blocks, and then fixing the stacked building block type quick-mounting power distribution devices onto a system feeder cabinet 500, wherein a main bus bar of the system feeder cabinet 500 is connected with the incoming line switching modules 200 of the building block type quick-mounting power distribution devices to output power signals, and the feed-out end assembly modules 400 of the building block type quick-mounting power distribution devices are connected with loads to output the power signals.

Figure 6:
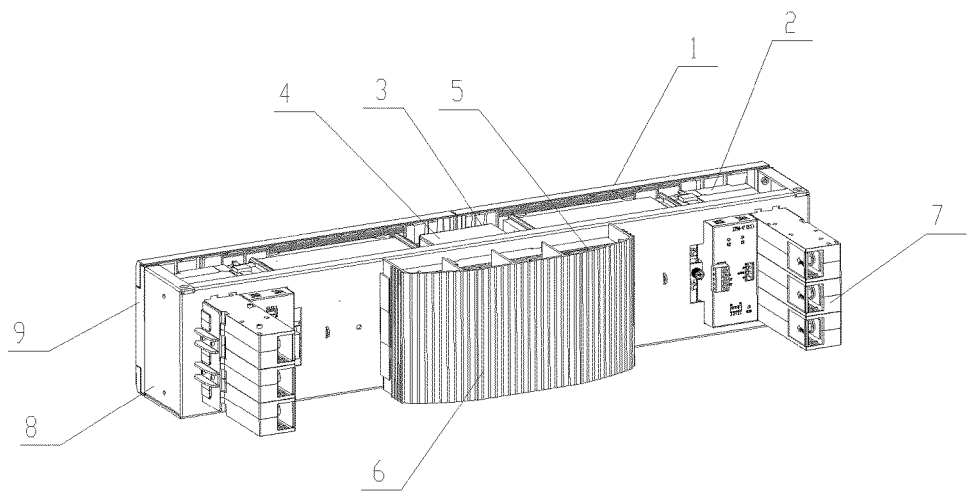
FIG. 6 is a rear view of a 100-250 A molded switch quick-mounting power distribution device molded switch according to embodiments of the invention.
Figure 7:
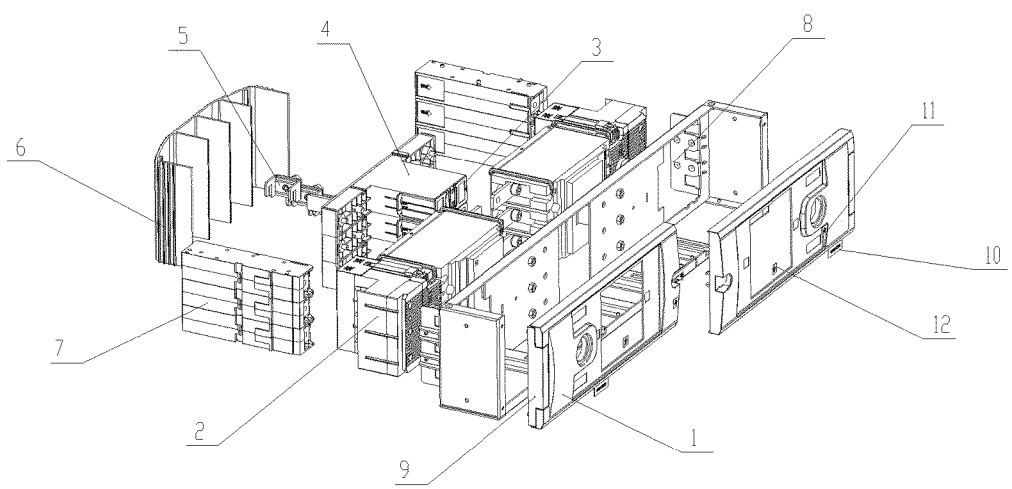
FIG. 7 is an exploded view of a 100-250 A molded switch quick-mounting power distribution device molded switch according to embodiments of the invention.

FIG. 5 to FIG. 7 show a front view, a rear view and an exploded view of a 100-250 A molded switch quick-mounting power distribution device molded switch according to the embodiments of the invention. As shown, the 63 A micro-switch and 100-250 A molded switch quick-mounting power distribution devices have same compositions and structures and may realize same functions, in addition to slight difference of internal connection relationships. For example, the switch measurement and control module 300 in the 63 A micro-switch quick-mounting power distribution device is disposed between the module panel 1 and the mounting plate assembly 8, while that in the 100-250 A molded switch quick-mounting power distribution device is disposed on one side of the mounting plate assembly 8 opposite to the module panel 1. All other arrangements are the same. It can be seen that the building block type quick-mounting power distribution device according to the embodiments of the invention is not limited to a specific kind of switches, but is universal for various switches such as Schneider switch, ABB switch, People Electric Appliance switch, Liangxin Electric Appliance switch, Changshu switch, and Siemens switch.

Figure 8:
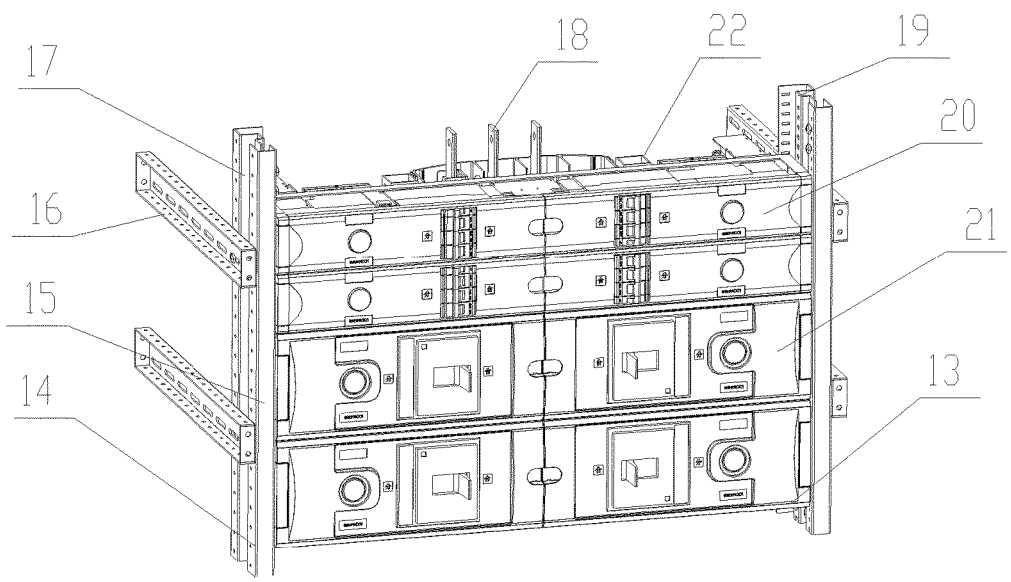
FIG. 8 is a front view a building block type quick-mounting power distribution device after screen assembling according to embodiments of the invention.
Figure 9:
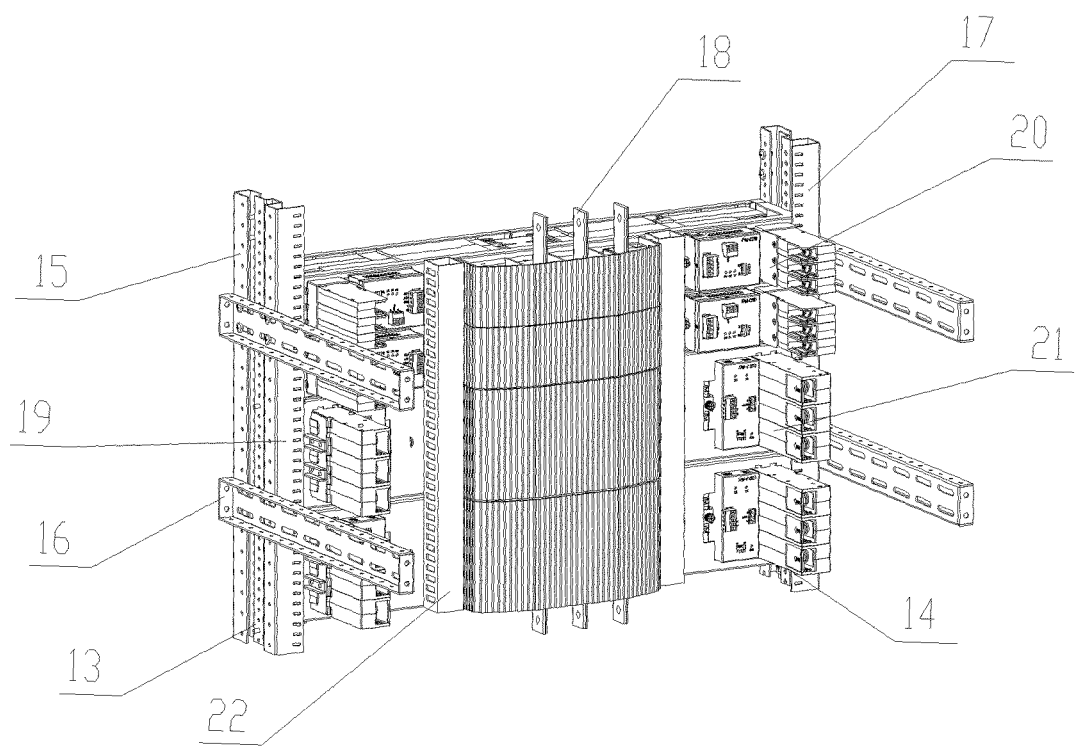
FIG. 9 is a rear view a building block type quick-mounting power distribution device after screen assembling according to embodiments of the invention.

FIG. 8 and FIG. 9 describe a process of mounting building block type quick-mounting power distribution devices according to the embodiments of the invention. FIG. 8 and FIG. 9 shows structure diagrams of two 63 A micro-switch quick-mounting power distribution devices and two 100-250 A molded switch quick-mounting power distribution devices after screen assembling. As shown, the building block type quick-mounting power distribution devices may be stacked together like building blocks in any combination. Four power distribution devices in the figures are in turn stacked up, two 100-250 A molded switch quick-mounting power distribution devices of which are located at the lower end. After these power distribution devices are stacked, the mounting assembly modules 100 are fixed a front mounting column 15, a rear left mounting column 17, a rear right mounting column 19, a right module support 13, a left module support 14 and a side mounting beam 16 of a system feeder cabinet 500 (i.e., a screen frame) so that the building block type quick-mounting power distribution devices are fixed on the screen frame as a whole, wherein the main bus bars 18 pass through the bus clamp assemblies 5 to be covered by the bus bar shields. Line slots 22 are provided on two sides of the bus bar shields to be close to the feed-out end assemblies 7. It can be seen from the screen assembling process that, various types of building block type quick-mounting power distribution devices may be configured in any combination during the screen assembling, and the screen assembling operation is very simple and convenient. What is needed to do is just to stack the power distribution devices one upon one like building blocks. Furthermore, since a single module occupies a small space, the capacity of a single screen is high.

It can be seen from the above descriptions that, in the building block type quick-mounting power distribution device according to the embodiments of the invention, the power distribution device comprises four sub-modules: the mounting assembly module, the switch measurement and control module, the incoming line switching module and the feed-out end assembly module. While realizing power distribution function for loads, the power distribution devices may be stacked according to configuration requirements one upon one like building blocks during the screen assembling, so the screen assembling is simple and convenient, and easy to realize. Furthermore, since a single module occupies a small space, the capacity of a single screen is high. In addition, due to the employment of plug-in secondary terminals between four modules, there is no any secondary line. The standardization degree of production, mounting and maintenance is quite high, so the quality of products is greatly stabilized and improved. In addition, due to the arrangement of the incoming line switching module and the feed-out end assembly module, no additional incoming line device and outgoing line device are required when in service.

Those skilled in the art will appreciate that the invention may have various modifications or variations according to the above descriptions, and all those modifications or variations should fall into the protection scope defined by the accompanying claims of the invention.

What is claimed is:

1. A building block type quick-mounting power distribution device, comprising
   a mounting assembly module;
   an incoming line switching module for receiving and switching power signals,
   a switch measurement and control module for monitoring the power signals received by the incoming line switching module, and
   a feed-out end assembly module for outputting the power signals monitored by the switch measurement and control module to loads, which are all mounted on the mounting assembly module, respectively,
   wherein the mounting assembly module comprises a module panel for mounting the incoming line switching module, the switch monitoring module and/or the feed-out end assembly module, and a mounting plate assembly detachably connected to the module panel.

2. The building block type quick-mounting power distribution device according to claim 1, wherein the incoming line switching module comprises a loop switch and an incoming line switching assembly provided with a first sub-bus bar, wherein power signals received from a main bus bar of a system feeder cabinet via the first sub-bus bar of the incoming line switching assembly are switched via the loop switch.

3. The building block type quick-mounting power distribution device according to claim 2, wherein the incoming line switching module comprises:
 a protection plate for avoiding misoperation during the live line work of the loop switch;
 a bus clamp assembly for connecting with the first sub-bus bar; and
 a bus bar shield for electric shielding.

4. The building block type quick-mounting power distribution device according to claim 2, wherein the module panel is provided with a sign for indicating the type and name of loads carried by the loop switch and/or an OPEN label and a CLOSE label for displaying the working state of the loop switch.

5. The building block type quick-mounting power distribution device according to claim 1, wherein the switch measurement and control module is in communication with a system monitoring center for transmitting results of monitoring to the system monitoring center.

6. A method for mounting a building block type quick-mounting power distribution device, comprising the following steps of:
 stacking the building block type quick-mounting power distribution devices according to any one of claims 1 and 2 to 5 like building blocks; and
 fixing the stacked building block type quick-mounting power distribution devices onto a system feeder cabinet, wherein a main bus bar of the system feeder cabinet is connected with the incoming line switching modules of the building block type quick-mounting power distribution devices to output power signals, and the feed-out end assembly modules of the building block type quick-mounting power distribution devices are connected with loads to output the power signals.

7. The method for mounting a building block type quick-mounting power distribution device according to claim 6, wherein, in the step of fixing the stacked building block type quick-mounting power distribution devices onto the system feeder cabinet, the mounting assembly modules of the building block type quick-mounting power distribution devices are fixed on a front mounting column, a rear left mounting column, a rear right mounting column, a right module support, a left module support and a side mounting beam of the system feeder cabinet, respectively, so that the building block type quick-mounting power distribution devices are fixed on the system feeder cabinet as a whole.

8. A building block type quick-mounting power distribution device, comprising
 a mounting assembly module;
 an incoming line switching module for receiving and switching power signals,
 a switch measurement and control module for monitoring the power signals received by the incoming line switching module, and
 a feed-out end assembly module for outputting the power signals monitored by the switch measurement and control module to loads, which are all mounted on the mounting assembly module, respectively,
 wherein the incoming line switching module comprises a loop switch and an incoming line switching assembly provided with a first sub-bus bar, wherein power signals received from a main bus bar of a system feeder cabinet via the first sub-bus bar of the incoming line switching assembly are switched via the loop switch.

9. The building block type quick-mounting power distribution device according to claim 8, wherein the incoming line switching module comprises:
 a protection plate for avoiding misoperation during the live line work of the loop switch;
 a bus clamp assembly for connecting with the first sub-bus bar; and
 a bus bar shield for electric shielding.

10. The building block type quick-mounting power distribution device according to claim 8, wherein the module panel is provided with a sign for indicating the type and name of loads carried by the loop switch and/or an OPEN label and a CLOSE label for displaying the working state of the loop switch.

* * * * *